: 2,891,970
Patented June 23, 1959

2,891,970
PROCESS FOR PREPARING BASIC N-DIEPOXIDES

Gunter Frank and Richard Wegler, Leverkusen, and Walter Krauss, Koln-Stammheim, Germany, assignors to Farbenfabriken Bayer Aktiengesellschaft, Leverkusen, Germany, a corporation of Germany No Drawing. Application December 6, 1955
Serial No. 551,212

Claims priority, application Germany December 6, 1954

1 Claim. (Cl. 260—348.6)

This invention relates to a process for the production of basic N-diepoxides.

It is known that weakly basic aromatic diepoxides can be obtained by reacting one mol of aniline or an aniline derivative with 2 mols of epichlorhydrin to form N-di-(3-chloro-2-hydroxy-propyl)-amine and treating the latter in ethereal solution with powdered potassium hydroxide (Strukov, Khim. Farm. Prom. 1934, No. 2, 11; Chemical Abstracts 1934, 28, 5421; R. F. Homer, Journal of the Chemical Society, 1950, 3690–3691). However, the process is not suitable for obtaining basic diepoxides on a technical scale owing to the use of ether and the very low yields (10–42%).

It has now been found that basic aromatic and aliphatic diepoxides which contain two epoxypropane groups on one nitrogen atom are obtained in a smooth reaction and with good yields if free primary, aromatic or aliphatic amines are reacted with epichlorhydrin to form the corresponding di-(hydroxy-chloropropyl)-amines and these latter are treated with aqueous sodium or potassium hydroxide solution.

Examples of primary aromatic or aliphatic amines which are suitable for the process of the present invention are propylamine, butylamine and aniline.

The process of the invention can be carried out, for example, by first adding the epichlorhydrin dropwise to the primary amine. After the di-(3-chloro-2-hydroxypropyl)-amine has been formed, the epoxide can be obtained by slowing adding aqueous sodium or potassium hydroxide solution, preferably at room temperature.

If is frequently advantageous to work in the presence of a solvent, such as for example methanol, ethanol, benzene or toluene.

The basic diepoxides which are formed can generally be obtained from the reaction mixture by distillation. The fact that the strongly basic aliphatic diepoxides can be distilled is particularly surprising, since tertiary amines have been proposed as catalysts for the hardening of epoxide compounds.

It was also surprising that the epoxides are not hydrolysed by the aqueous alkali, but that on the contrary a considerably better yield can be produced than when using ether and pulverous alkali hydroxide.

The diepoxides obtained by the process of the invention are of great importance for the manufacture of plastics. For example, they can be hardened in known manner to form insoluble compounds with bifunctional or polyfunctional compounds such as alcohols, carboxylic acid, carboxylic acid anhydrides, phenols, isocyanates, amines or aldehydes.

As compared with the non-basic epoxides, the basic diepoxides have a number of important advantages when used. It has already been mentioned that they can easily be purified by distillation. Moreover, the epoxypropane groups bonded to a nitrogen atom do not cross-link as readily with diamines and polyamines as ethereally bonded epoxy-propane groups. Consequently, the basic diepoxides can be mixed and reacted more easily than the non-basic epoxides with the very reactive polyamines without a premature disturbing reaction taking place. On the other hand, in view of their basic nature the basic diepoxides show a substantially higher reactivity than the non-basic epoxides towards phthalic acid anhydride, which plays an important part as a hardening component for plastics and lacquers. Accordingly, no difficulties arise in preparing cold-hardening lacquers from basic diepoxides and phthalic acid anhydride. The basic diepoxides also have an improved bonding strength to various surfaces, particularly those of a slightly acid nature, such as for example silica, this improved bonding strength being advantageous in many cases for adhesive purposes.

The basic diepoxide hardening products can be used for all purposes for which diepoxide hardening products are known to be used. If the hardening products have been prepared by adding aliphatic diamines or polyamines, they can also be used for example as exchanger resins, as high-grade casting resins particularly suitable for electrical purposes or as laminated materials.

The following examples further illustrate the invention without, in any way, limiting it thereto.

Example 1

59 grams of n-propylamine (1 mol) are added dropwise to 200 grams of epichlorhydrin (2 mols=185 grams) while stirring at 28–32° C. over a period of 30 minutes; the reaction mixture is then maintained at 30° C. for four hours. The mixture is cooled to 20° C., and 300 cc. of 44% sodium hydroxide solution are added dropwise over a period of 30 minutes at 20–25° C. The mixture is stirred for 3 hours and then diluted with about 300 cc. of water, whereupon all the sodium chloride precipitated enters into solution. After settling, the upper layer is separated off, shaken for a short time with cold 50% potassium hydroxide solution, and then the upper layer is separated and distilled under water jet vacuum (B.P. 12: 105–120° C.); by rectification, 122 grams=71% diepoxy-propane propylamine (B.P. 12: 113–115° C.) are obtained. The diepoxide is a crystal-clear highly mobile liquid which becomes slightly yellowish in color after standing for a relatively long period.

Analysis for $C_9H_{17}O_2N$—Calculated: C, 63.15%; H, 9.94%; O, 18.71%; N, 8.18%. Found: C, 62.75%; H, 10.00%; O, 19.00%; N, 8.1%.

Example 2

73 grams of n-butylamine (1 mol) are added dropwise over a period of 30 minutes to 200 grams of epichlorhydrin (2 mols=183 grams) while stirring at a temperature of 28–32° C., and the reaction mixture is kept at 30° C. for 4 hours. 300 cc. of 44% sodium hydroxide solution are then added dropwise at 20–25° C. over a period of 30 minutes, the mixture is stirred for another 3 hours and diluted with such an amount of water that the precipitated sodium chloride dissolves (i.e. 300 cc.). After settling, the upper layer is separated off, shaken for a short time with cold 50% potassium hydroxide solution and distilled under high vacuum. (The diepoxy-propane-butylamine can also be taken up in benzene, dried with solid potassium hydroxide and worked up in the usual manner.)

The 75–95° C. fraction at a pressure of 0.3 millimeter is collected and rectified. Yield: 140 grams of 75% pure diepoxypropyl-butylamine (B.P. 0.3: 79–81° C.), this being a crystal-clear liquid which is highly mobile.

Analysis for $C_{10}H_{19}O_2N$—Calculated: C, 64.86%; H, 10.27%; O, 17.29%; N, 7.56%. Found: C, 64.70%; H, 10.30%; O, 17.37%; N, 8.0%.

Example 3

A mixture of 400 grams of epichlorhydrin (4 mols =370 grams) and 400 cc. of methanol is heated to boiling point. 2 mols of aniline are then added dropwise over a period of 15 minutes and the solution boiled for 3 hours under reflux. The alcohol is then distilled off, 200 cc. of benzene are added, and 600 cc. of 44% sodium hydroxide solution are added dropwise at 20–25° C. over a period of 30 minutes. The mixture is vigorously stirred for another three hours and then such an amount of water is added that all the precipitated sodium chloride dissolves. The layers are then separated. The benzene solution of the diepoxide is briefly dried with solid potassium hydroxide and distilled. The fraction of the boiling point 0.15: 136–138° C. is the pure diepoxide, which is a light yellow highly mobile oil. Yield: 314–340 grams=76–82% of the theoretical.

Analysis for $C_{12}H_{15}O_2N$—Calculated: C, 70.24%; H, 7.31%; N, 6.84%; O, 15.61%. Found: C, 70.20%; H, 7.45%; N, 6.80%; O, 15.65%.

Example 4

(a) 117 grams of 26.4% methylamine solution (1 mol) are added dropwise over a period of 2 hours to 200 grams of epichlorhydrin (=2.16 mols) while stirring at 25–30° C., and the reaction mixture is thereafter kept for 45 minutes at 25–30° C. 300 cc. of 40% sodium hydroxide solution are then added over a period of 40 minutes at 25–30° C., the mixture is stirred for a further 40 minutes at this temperature, and finally 200 cc. of water are added. After settlement has taken place, the upper layer is separated off and distilled over potassium hydroxide after being briefly dried. At a pressure of 12 millimeters, 27 grams=52% of diepoxypropane methylamine pass over at 96–98° C. The diepoxide is a crystal-clear liquid which is miscible with water in any proportion.

(b) 10 grams of water are mixed with 4 grams of diepoxypropane methylamine and 1.2 grams of ethylene diamine and the mixture allowed to stand at room temperature. The solution is heated over a period of 5 minutes to 80° C., and solidifies to give a clear colorless gel. (Molar ratio of diepoxide:ethylene diamine =1:0.75.) For a cross-linking reaction, a molar ratio between diepoxide and ethylene diamine of 1:0.5 is sufficient.

We claim:

A process for the production of basic diepoxides which contain two epoxypropane groups on a single nitrogen atom which comprises condensing two mols of epichlorohydrin with one mol of the free base of a primary amine of the group consisting of primary lower aliphatic and primary phenyl monoamines in which the primary amine groups are the sole groups which are reactive with epichlorohydrin, said condensation being effected at a temperature from about room temperature to about 80° C., to produce a di(3-chloro-2-hydroxypropyl)-amine, then contacting the reaction mixture of the latter at about 20–30° C. with an aqueous solution of a member of the group consisting of sodium and potassium hydroxide until a diepoxypropane amine is formed, and recovering said diepoxypropane amine from the reaction mixture.

References Cited in the file of this patent

UNITED STATES PATENTS

| | | |
|---|---|---|
| 1,790,042 | Eisleb | Jan. 27, 1931 |
| 1,977,253 | Stallmann | Oct. 16, 1934 |
| 2,143,388 | Schlack | Jan. 10, 1939 |
| 2,469,683 | Dudley | May 10, 1949 |
| 2,558,711 | Weisblat | June 26, 1951 |
| 2,629,733 | Weisblat | Feb. 24, 1953 |

OTHER REFERENCES

Homer: J. Chem. Soc., vol. 1959, pages 3690–1 (1950).